United States Patent [19]
Hirakue

[11] Patent Number: 5,719,612
[45] Date of Patent: Feb. 17, 1998

[54] INFORMATION PROCESSING APPARATUS

[75] Inventor: Toshimitsu Hirakue, Tokyo, Japan

[73] Assignee: Canon Kabushiki Kaisha, Tokyo, Japan

[21] Appl. No.: 606,875

[22] Filed: Feb. 26, 1996

Related U.S. Application Data

[63] Continuation of Ser. No. 171,179, Dec. 22, 1993, abandoned.

[30] Foreign Application Priority Data

Dec. 25, 1992 [JP] Japan ................. 4-358295

[51] Int. Cl.$^6$ ................. B41J 29/13; H04N 1/034
[52] U.S. Cl. ................. 347/108; 347/3
[58] Field of Search ................. 347/108, 3

[56] References Cited

U.S. PATENT DOCUMENTS

| | | | |
|---|---|---|---|
| 3,822,083 | 7/1974 | Zeamer | 312/208 |
| 4,313,124 | 1/1982 | Hara | 346/140 |
| 4,345,262 | 8/1982 | Shirato et al. | 346/140 |
| 4,459,600 | 7/1984 | Sato et al. | 346/140 |
| 4,463,359 | 7/1984 | Ayata et al. | 346/1.1 |
| 4,558,333 | 12/1985 | Sugitani et al. | 346/140 |
| 4,608,577 | 8/1986 | Hori | 346/140 |
| 4,723,129 | 2/1988 | Endo et al. | 346/1.1 |
| 4,740,796 | 4/1988 | Endo et al. | 346/1.1 |
| 4,808,020 | 2/1989 | Kudo | 400/663 |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |

OTHER PUBLICATIONS

T.L. Wilmoth, IBM Technical Disclosure Bulletin, "Carriage Locking Mechanism", vol. 22, #12, May 1980, pp. 5229–5230.

*Primary Examiner*—Valerie Lund
*Attorney, Agent, or Firm*—Fitzpatrick, Cella, Harper & Scinto

[57] ABSTRACT

An information processing apparatus apparatus comprising a first and second housings fold-up on each other, and provided with a means for protecting the recording head or carriage from shock due to the incidental falling or collision during storage or conveyance, thereby preventing rattles caused by vibration, and also preventing incorrectness of standby position or erroneous control of movement upon being reused.

18 Claims, 7 Drawing Sheets

INFORMATION PROCESSING APPARATUS

This application is a continuation of application Ser. No. 08/171,179, filed Dec. 22, 1993, now abandoned.

BACKGROUND OF THE INVENTION

1. Field of the Invention

The present invention relates to an information processing apparatus using head means, such as a reading head for reading a document or a recording head for recording information.

2. Brief Description of the Prior Art

In general, information processing apparatus used as a printer, copying machine or facsimile, as well as employed as an output device for a composite device or work station including a computer or word processor are constructed to record various images, including characters or symbols, on a recording medium such as papers or plastic sheets for an OHP in accordance with image information. These recording apparatus are variously classified as, e.g., ink jet, wire dot, heat sensitive, thermal transfer or laser beam, in accordance with the recording means to be employed.

In a serial type information processing apparatus or recorder employing a recording process in which a "main scanning" is performed in the transverse direction with respect to that of feed of the recording medium, one line recording is performed such that: a recording medium is set in a predetermined recording position; then images, including characters and symbols, are recorded by a recording device (recording head) mounted on a carriage which is movable along the recording medium, thus one line recording is finished, followed by a paper feed of a predetermined amount (called a "sub-scanning"). Thereafter, the next line is recorded by way of another "main scanning". Such a process is repeated and all images are recorded over the desired range of the recording medium. On the other hand, in a line printer, in which recording is performed merely by a sub-scanning which feeds the recording medium in the direction of conveyance, after the recording medium is set, a predetermined amount of paper feed (a pitch feed) is carried out while one line recording is collectively and continuously performed. In this manner all images are recorded over the entire range of the medium.

In an ink jet recorder, ink is ejected from the recording means, such as a head, onto the recording medium to perform a recording process, and a compact construction of the recording medium is easily realized. Various advantages thereof include: image recording of high precision and high speed on normal paper (that is, paper which has not undergone any special processing), low running costs, and low noise, owing to its no impact type. In addition, multi-color image recording is also easily performed using multi-color ink.

In particular, an ink jet recording head of the type in which ink is ejected using thermal energy is easily manufactured through semiconductor manufacturing processes such as etching, evaporation and sputtering, in a form including an electrothermal transducer, electrodes, liquid passage walls and ceiling decks, and is thereby further of simplified construction. Also, utilizing IC and microelectronic techniques provides an elongated or surface extended construction of the devices, and multi-structure or high density construction of the recording means.

Figure 8:
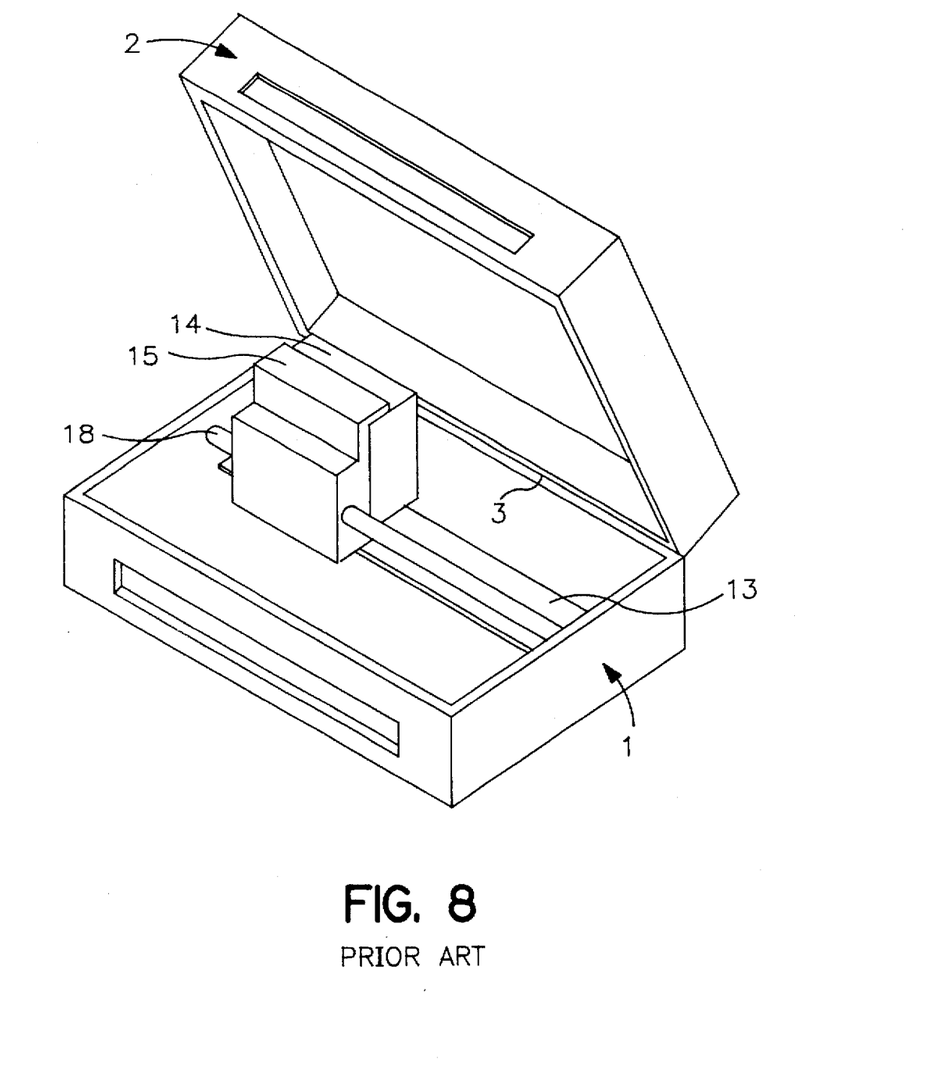
FIG. 8 is a perspective view schematically illustrating a conventional fold-up apparatus just being folded.
Figure 9:
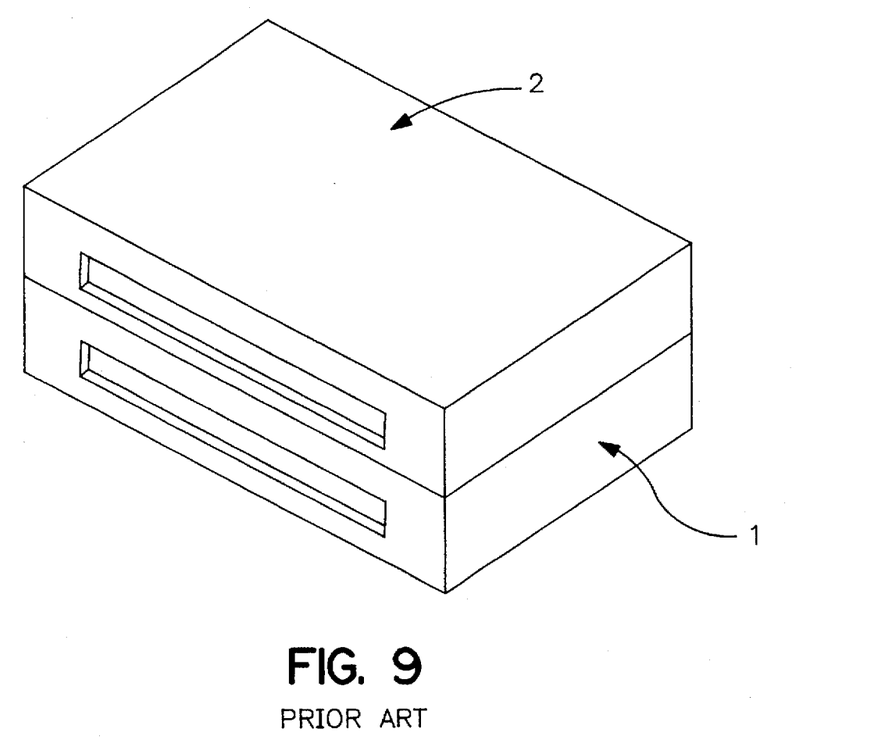
FIG. 9 is a perspective view schematically illustrating the apparatus in FIG. 6 in the closed state.

Some of fold-up type recorders are already being used for ensuring safety of storage and conveyance. FIG. 8 is a illustration of an example thereof being folded, and FIG. 9 show the same after being folded. In FIG. 8, the information processing apparatus is comprised of two housings, the first housing 1 and second housing 2, which are connected to be folded on each other with respect to a hinge 3 as a pivot shaft.

In FIG. 8, a platen 13 for securing a recording medium such as paper sheet in a recording position is provided within the first housing 1, and recording means, such as a recording head 14, is mounted to be reciprocally movable along a path opposite to the platen 13. Therefore, recording head 14 is mounted on a carriage 15, which is movably supported on a guide rail 18 secured in the first housing 1. When recording, carriage 15 is driven by a motor and connection means (not shown) and, in synchronization with the latter, the recording head 14 is moved in accordance with the image signal, thereby causing images included in one line to be recorded on a recording medium (not shown) around the platen 13. Upon completion of one line of recording, a paper feed of a predetermined amount is followed by recording of the next line with the carriage 15 being moved. In the same manner, a paper feed and one line recording are repeated until all images are recorded over the entire recording medium.

When no recording is to be carried out, the carriage 15 is returned to a predetermined home position, that is, the record starting position or a standby position including that adjacent the starting position, and is suspended in such a position. While the recorder is stored or conveyed, the first and second housings are pivoted around the hinge 3 to be folded on each other as illustrated in FIG. 9.

However, conventional information processing apparatus are not free from problems. That is, even when the apparatus is conveyed with the housings being folded on each other, any shock which is applied on the processing apparatus due to falling or collision will cause a sudden movement of recording head 14 or carriage 15, resulting in damage to the connection between carriage 15 and guide rail 18, or causing incorrect positioning or improper control of movement of recording head 14. Also, other disadvantages due to the play provided between the mechanical parts include a sound produced by repetition of minute movements during conveyance of the processing apparatus, and degradation of mechanical endurance.

SUMMARY OF THE INVENTION

With regard to the above-described technical problems, a principal object of the present invention is to provide an information processing apparatus of a simple construction having housings allowed to be open and closed with respect to each other, by which a recording head or reading head and/or any mounting means therefor is prevented from undesired displacement.

Another object of the present invention is to provide an information processing apparatus, having a simple fold-up construction, which is capable of preventing any undesirable displacement of the head means or the carriage therefor due to shock encountered during storage or conveyance of the apparatus.

A further object of the present invention to provide an information processing apparatus, with simple fold-up construction, which prevents any displacement of the head means or mounting means therefor, and which is capable of preventing production of sound caused by collision between the head means and the housing during conveyance, and which also protects the head means or mounting means from the shock caused by any occurrence such as falling.

A still further object of the present invention is to provide an information processing apparatus, with a simplified construction allowing for an open and closed state, which prevents any displacement of the head means or mounting means therefor, and which is capable of preventing the incorrect standby position of the head means or head mounting means or any improper control of movement thereof.

Accordingly, still another object of the present invention is to provide an information processing apparatus performing information processing provided with head means, which comprises a first housing and a second housing being open away and closed to each other; a support member mounted within the first housing for supporting the head means; and a restraining member provided within the second housing for restraining the displacement of the support member, wherein the restraining member restrains displacement of the support member or the head means at a closed State of the first and second housings.

DETAILED DESCRIPTION OF THE PREFERRED EMBODIMENTS

Figure 1:
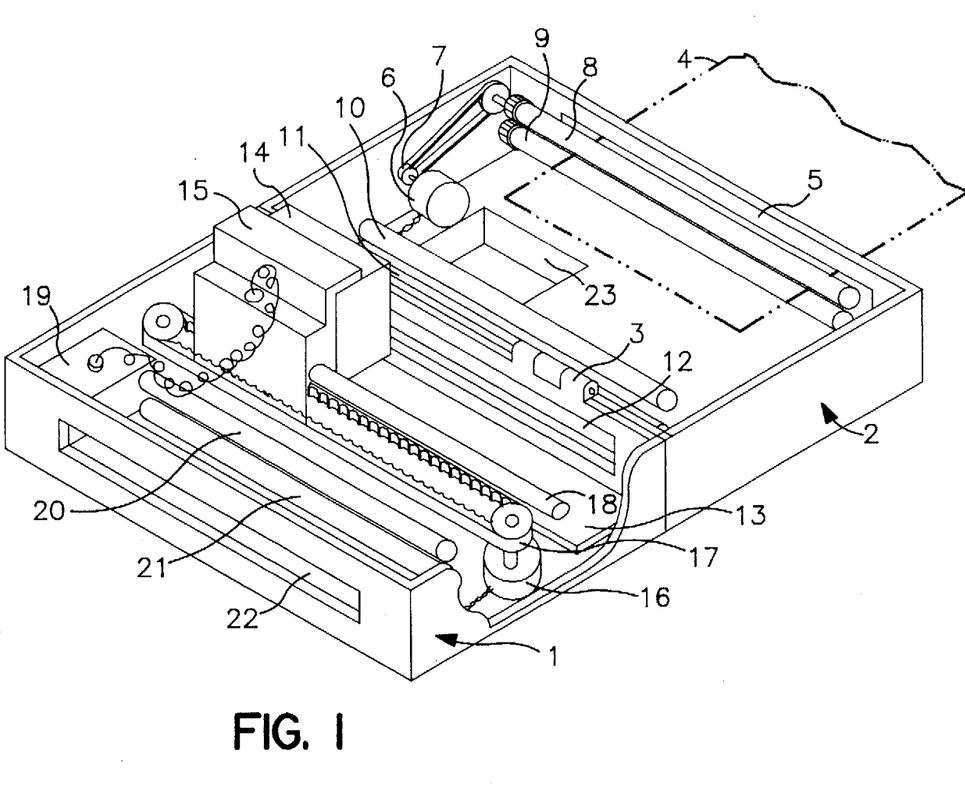
FIG. 1 is a perspective view schematically illustrating a recording apparatus in a condition of operation.

FIG. 1 is a perspective view of an embodiment of an information processing apparatus in operation according to the present invention. As shown, the entire apparatus is comprised of a first housing 1 and a second housing 2, which are swingably combined to each other with respect to a hinge 3. Also, FIG. 1 illustrates the condition, in which both housings 1 and are open and ready to start a recording operation upon receiving an external signal. The illustrated embodiment relates to an ink jet type recording apparatus.

As shown, a recording medium such as paper sheet 4 is fed to the interior of the recording apparatus through a paper inlet 4 provided on the first housing 1, and is fed through paper feed rollers 8 and 9 and a pair of transport rollers 10 and 11, through an opening 12 and reaches a guide surface, that is, a platen surface, of a platen 13 which is disposed within the first housing 1. Recording means, that is, a recording head 14, is mounted to be reciprocally movable along a path disposed opposite to the platen 13 with a predetermined space. Accordingly, the head 14 is mounted on a carriage 15, wherein the carriage 15 is driven by a drive motor 16 and is allowed to reciprocally move along a guide rail 18 disposed in the first housing 1.

Synchronized with movement of carriage 15, called "main scanning", and in accordance with movement of head 14 driven by a driving unit 19 based on the image signal, one line of images is recorded on recording medium 4. Subsequently, the paper feed rollers 8, 9 and transport rollers 10, 11 are rotated for a predetermined amount of rotation for feeding the paper for a predetermined amount of rotation for feeding the paper for a predetermined amount thereof (called "sub-scanning"). Then, the subsequent line is printed with the carriage 15 being moved. Such one line recording and paper feed operation is repeated until recording is accomplished over the entire recording medium.

The image recorded medium 4 is then introduced between a pair of paper dispenser rollers 20 and 21, and fed out of the recorder through an outlet opening 22 provided in the first housing 1. When no recording is performed, carriage 15 is allowed to rest in a home position including record starting position or an adjacent standby position.

Figure 2:
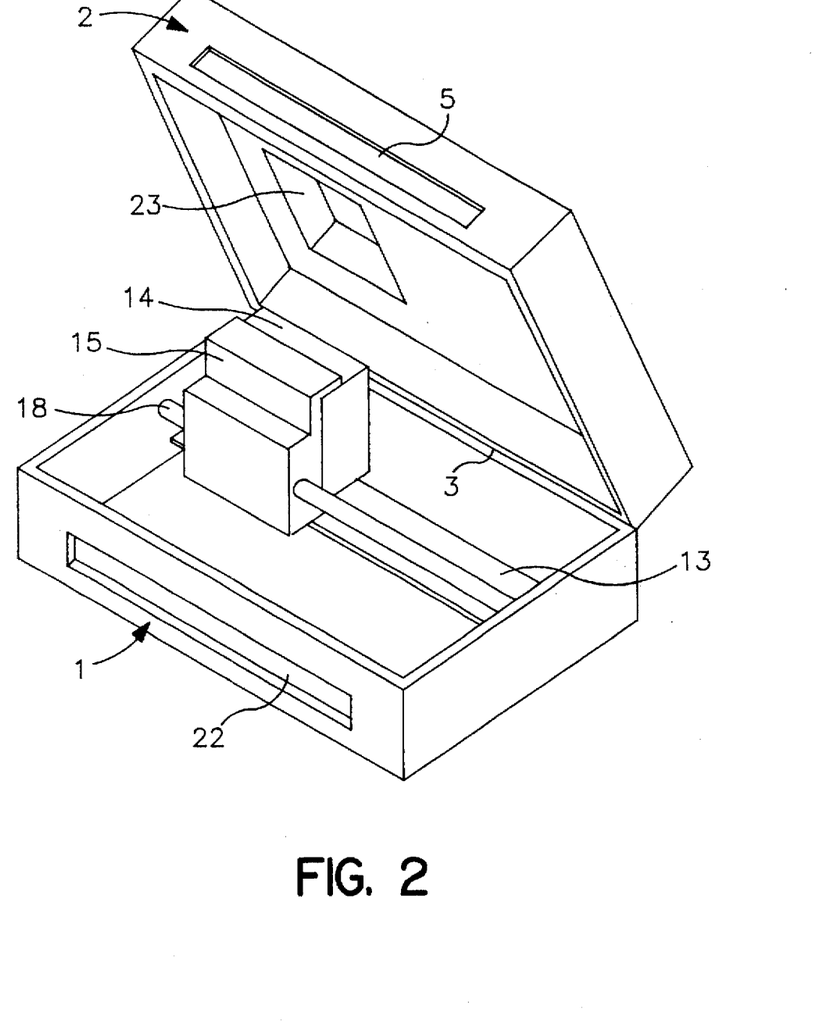
FIG. 2 is a fragmentary perspective view schematically illustrating the apparatus of FIG. 1 just being folded.

An opening 23 is formed at a predetermined position of second housing 2, corresponding to the position in which the head 14 and carriage 15 are in their rest condition, which opening may engage with the upper portion of recording head 14 or of carriage 15 to serve to retain these and prevent movement of the head 14 and carriage 15. FIG. 2 is a summary perspective view of the recorder which is just in the process of being closed, and FIG. 3 is a sectional front view of the recorder in an already closed state, thereby preventing displacement of recording head 14.

During non-recording, either storage or conveyance of the recorder, the recording head 14 and carriage 15 are in the retained position, and the first and second housings are pivoted with respect to the hinge 3 to be closed and completely superimposed with each other. Accordingly, the head 14 and carriage 15 engage with the opening 23 at their upper portions and are therefore prevented from movement. It is preferable to prevent even a minute displacement of the instrument during conveyance due to small gap between each mechanical part, by suspended not only in the lateral direction viewed in FIG. 3 but also in the transverse direction thereto. However, when the movement of head 14 and carriage 15 is permitted only along the guide rail 18, the opening 23 may be formed in its shape and dimension capable of preventing only the movement in the direction of guide rail 18. In the embodiment shown herein, the movement of head 14 (not shown in this view) is prevented by means of the opening 23, formed though the housing 2. This may be also of a recessed portion not penetrating through the housing 2. In other words, the "opening" in the invention may be formed so as not to penetrate the housing 2, or so as to partially penetrate the housing 2. Various materials may be employed for each component of the recorder. In one embodiment, the first and second housings 1 and 2 were formed of denaturated polyphenylene ether resin (noryl), and recording head 14 and carriage 15 were of polycarbonate resin. The housings may be also formed of ABS resin or polypropylene resin. In addition, the recording head and carriage may be formed of a resin such as polyacetal resin, or any of metals such as aluminum alloy. Also, instead of a motor 16 and a belt 17 as the drive means provided in FIG. 1, any other drive means may be also applied, such as a linear motor, a supersonic motor or a lead screw device.

Figure 3:
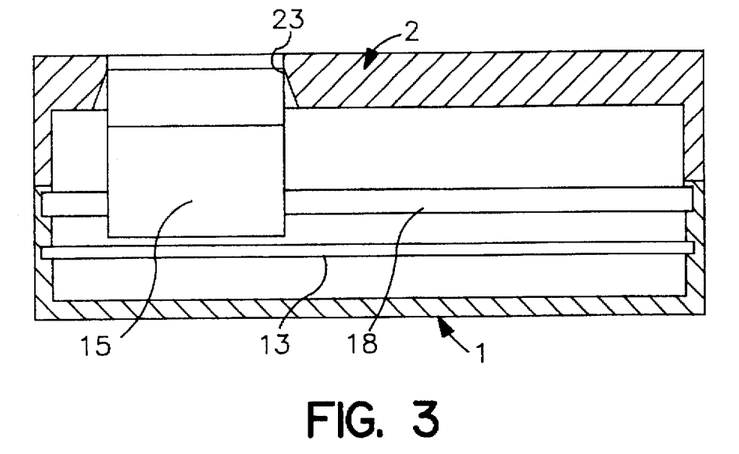
FIG. 3 is a fragmentary front view in section schematically illustrating the apparatus if FIG. 1.

In the embodiment shown in FIG. 1 to FIG. 3, in which the invention is applied to an ink jet recording apparatus, the recording head 14 is a recording device utilizing thermal energy for injecting ink, and therefore is provided with an electrothermal transducing means. The recording means is of the type utilizing a pressure variation caused by growth and contraction of air bubbles due to membrane boiling function by thermal energy supplied by the electrothermal transducer mentioned above.

Figure 4:
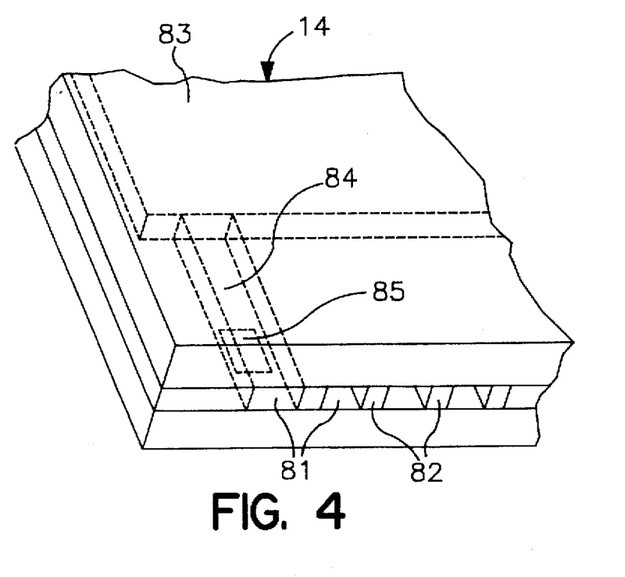
FIG. 4 is a fragmentary perspective view schematically illustrating the apparatus in FIG. 1.

FIG. 4 is a fragmentary perspective view schematically illustrating the ink-injecting portion of recording head 14. As shown in FIG. 4, a number of spaced outlet openings 82 with a predetermined pitch therebetween are formed on an outlet surface 81 opposed to recording medium 4 with a predetermined space, e.g. approximately 0.5 to 2.0 mm, and an electrothermal transducer, such as a heat-generating resistor, for producing energy for ink-injection is disposed along the wall of each liquid (ink) passage 84 in communication of a common liquid chamber 83 with each of outlet openings 82. Recording head 14 (not visible in this view) is mounted on the carriage 15 such that the outlets 82 are arranged in the direction transversely with respect to that of the movement of carriage 15 (the main scanning direction). Thus, the recording means 14, or recording head, is constructed, in which the transducer 85 is driven (energized) based on an image signal or outlet signal, to permit the ink within the ink passage 84 to boil and, using the produced pressure therefrom, the ink is injected.

In the above first embodiment in FIG. 1 to FIG. 4, an opening 23 is provided in a portion of the housings 1 and 2 so that recording head 14 and/or carriage 15 engages or engage with the opening 23 for preventing any movement of recording head 14 and/or carriage 15 caused by shock due to the occurrence of falling or a collision during storage or conveyance, and also protecting the mechanism of the recording means from any shock or damage.

Also, it is possible to prevent minute movements or rattles of recording head 14 and/or carriage 15, thereby preventing production of unpleasant sounds due to gaps existing between the mechanical parts. In addition, the apparatus will not be folded or closed when the operator mistakenly turns the power off before the control of conveying means is completed causing the carriage 15 to stop out of the correct position. Therefore, since the apparatus can not be stored in such a state, ink leakage due to possible defective packing or the like sometimes caused in the case of an ink jet recorder is automatically prevented. Also, by providing a door switch which operates according to the mutual swing action of the first and second housing, it is made possible to prevent any failure of leaving the power turned on, even after the apparatus is folded to be stored or conveyed.

Figure 5:
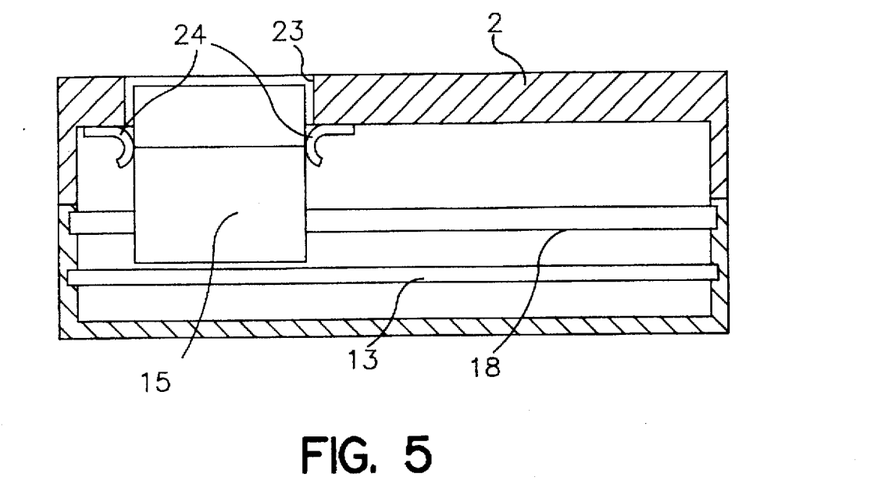
FIG. 5 is a front view in section schematically illustrating an apparatus in the closed state.

It is also possible to further improve the movement preventing effect by providing another form of preventing member other than an opening in the housing 2. FIG. 5 is an illustrative front view in section showing such a preventing member provided in the housing 2. As shown, a spring 24 as a restraining member is secured on the inner surface (not visible in this view) of housing 2 adjacent the opening 23, for preventing movement of head 14 and/or carriage 15. The spring 24 may be disposed either on only one pair of opposite edges, or both pairs of edges perpendicular to each other, which will further increase the above movement-preventing effect.

The restraining spring 24 may be formed of a resilient metal, which is secured by deforming, screw retention, applying an adhesive agent or the like, and otherwise formed of a resilient synthetic resin. A resin material may be formed either separately from or integrally with the housing 2, having the portion partially extending from the housing 2 which may serve as a spring member.

The embodiment in FIG. 5 is different from that in FIG. 3 by addition of retention spring 24 but the other structure is the same, and further increases the effect of preventing the movement of head 14 and carriage 15 than that of FIG. 3.

Figure 6:
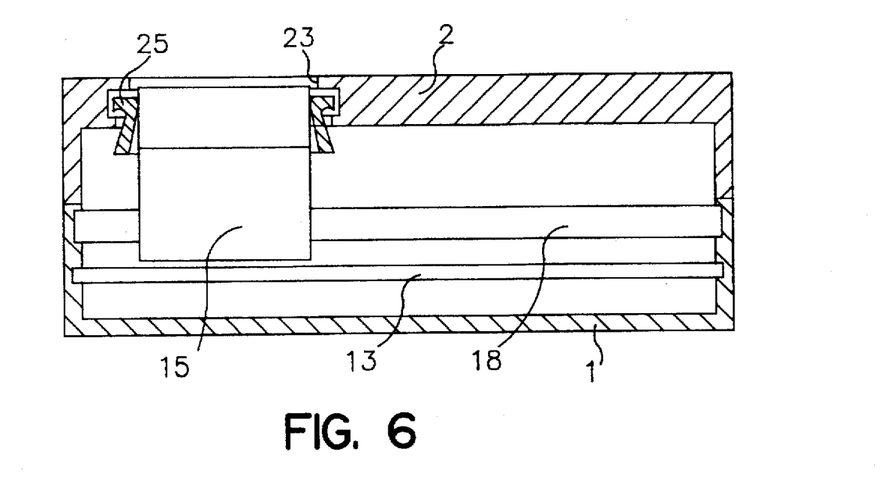
FIG. 6 is a front view in section schematically illustrating an apparatus having another construction in the closed state.

FIG. 6 illustrates another construction wherein, instead of the restraining spring 24, a frame-shaped sleeve 25 is inserted in the opening 23 of housing 2 allowing a slight movement therebetween to leave a freedom of engagement with recording head 14 (not visible in this view) and carriage 15, for providing the movement preventing effect for recording head 14 an carriage 15. Such a sleeve 25 may be formed of either a synthetic resin or metal.

Figure 7:
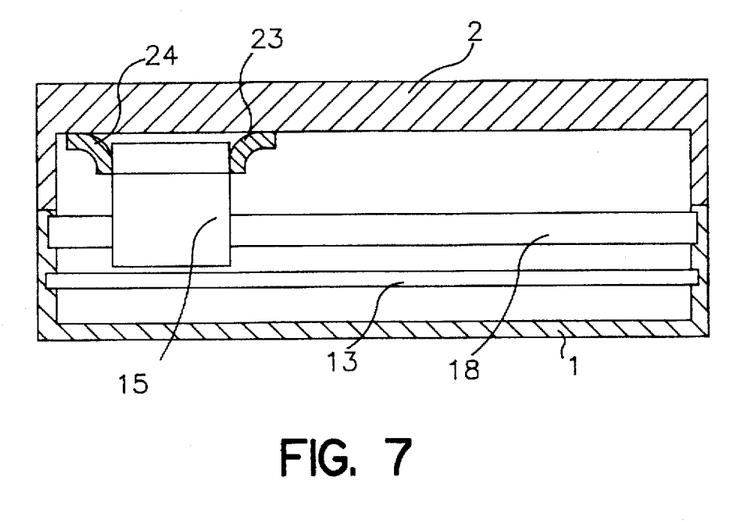
FIG. 7 is a front view in section schematically illustrating an apparatus having still further construction in the closed state.

In addition, FIG. 7 illustrates a fourth embodiment of the invention, in which a member for restraining the displacement of the recording head or head mounting means in the movable direction thereof is provided in the second housing, and such restraining member is secured in a position corresponding to the position of the member (such as, e.g. a carriage for the serial type, or a head mounting assembly for the full line type) which is mounted in the first housing. In such an arrangement, an opening 23 as provided in each of previously described embodiments is not provided in the second housing, and, instead, an projecting member 26 is provided as a restraining member for preventing displacement of the head or mounting means therefor. The remaining members are indicated by reference numerals the same as those in the previous embodiments and the detailed description is omitted. The member, which is resilient, serves to restrain the displacement of the recording head or any member so as to protect the head or head mounting means from collision or the like, and to prevent any sound from being produced during conveyance or improper positioning of the recording head.

In the case of the serial type recorder, the projecting member 26 may be positioned, formed, and in dimension thereof so as to restrain the displacement in the direction toward guide rail 18 of the recording head or carriage. Even when the recording head is large and heavy, by providing the projecting member 26 with an adequate dimension, resiliency or mounting strength to the second housing, it is possible to achieve the aforementioned effect.

In the full line construction, the recording head is normally secured to the housing by means of head mounting means. On the other hand, in either the case of replacement or maintenance of the recording head, or the case using an ink jet recording head, there is employed an arrangement for moving the recording head from its recording position to a predetermined position for receiving a treatment for recovering ink injection ability or a capping treatment for preventing dryness of the head during non-recording. In this case, the above-mentioned effect can be achieved by disposing the projecting member 26 at the position capable of preventing displacement of the recording head or mounting means therefor.

The invention is also applicable, other than an ink jet recorder, for any recording apparatus in use with such as a printer, copying machine or facsimile apparatus, and is applicable for any type of recorders utilizing either wire dot, thermal transfer, or laser beam, performing the same effect.

Also, other than the hereinbefore described serial type recording means in which a recording head is mounted on a carriage, the invention is also applicable for a line printer employing a line type recording head, wherein recording is performed merely through a sub-scanning process. Not only for a device having a single head, the invention is also applicable for a color recording device having a plurality of recording heads which record information with a number of different colors, a stepped-tone recorder also having a plurality of recording heads capable of recording with different stages of density of a single color, or any other device having a plurality of recording heads of any number or kinds, so long as performing the similar effect.

Other than the recording head as head means as described in the aforementioned embodiments, the present invention may also be applicable for a document reading apparatus in which a reading head capable of optically reading out a document is mounted on head mounting means, and, in addition, for an information processing apparatus in which each reading head and each recording head are alternatively mounted on head mounting means to read out a document and further to print out the read information on a recording medium, for providing the same effect as mentioned above.

In addition, the same effect is provided in an information processing apparatus, by having allowed to be open and closed such as a fold-up arrangement of the housings which restrains the displacement of the mounting means, and by having the head means detachable and therefore replaceable to the mounting means, even in the case that the head means is not mounted on the mounting means therefor.

The invention is also applicable for any ink jet devices, in which a recording head is formed integrally with an ink tank (ink chamber), or the head and ink tank are separate and connected through a supply tube or the like, or having any other construction of the head and ink tank.

Further, the invention may be applied for an ink jet recording apparatus employing an electric transducer such as a piezoelectric element. In particular, the invention may provide an excellent effect when in use for an ink jet recorder of the type wherein the ink is injected by utilizing thermal energy, thereby achieving recording of high density and high precision.

Also, the invention may be effectively applied for an ink jet recorder, in which a recording head is of the type provided with means for generating thermal energy utilized for injecting ink and causing the state conversion of the ink material, for achieving recording of high density and high precision.

For typical construction and principle of operation, it is preferable to utilize the basic principle disclosed in the U.S. Pat. Nos. 4,723,129 and 4,740,796. The type based on the disclosed principle may be applied either to the on-demand type or continuous type. The on-demand type is especially effective, by applying at least a drive signal on the electro-mechanical transducer, to produce thermal energy in the transducer to cause membrane boiling at the thermo-responsive surface of the recording means (recording head), and as a result, air bubbles in the liquid (ink) are produced corresponding one-to-one to the drive signal.

By the way of expansion and contraction of the bubbles, the ink is ejected through the outlet opening to format least one ink drop. It is more preferable to form the drive signal as a pulse form, since immediate and suitable expansion and contraction of the bubbles allow to achieve injection of the liquid (ink) having especially improved response property. As such a pulse signal, those disclosed in the U.S. Pat. Nos. 4,463,359 and 4,345,262 are suitable, and thereby a further excellent recording is achieved. Further improved recording is achieved when applying the conditions disclosed in the U.S. Pat. No. 4,313,124 describing an invention on the rate of temperature rise of the thermo-sensitive surface of the recording means mentioned above.

Besides the structure which combines an outlet with a liquid passage and an electric transducer, either of the structures disclosed in the U.S. Pat. Nos. 4,558,333 and 4,459,600 are in the scope of the invention. The former discloses a structure wherein a thermal effect device is provided in the bent portion. In addition, any structure based on the disclosure in either Japanese laid-open patent publication No. 59-123670 (1984) or No. 59-138461 (1984) is also applicable. The former discloses a structure wherein a common slit is provided as an outlet for a plurality of transducers, and the latter a structure of an opening for absorbing the pressure wave of thermal energy which is provided corresponding to the outlet. Accordingly, regardless of the arrangement of the recording head, the present invention provides an assured and effective recording.

The invention is also effectively applicable for a full line type recording head as mentioned above, having a length corresponding to the maximum width of a recording medium which can be recorded by the recording apparatus. Such a recording head may be either of a construction in which its length is satisfied by the combination of a plurality of recording head, or as a construction of integrally formed one recording head.

Besides the aforementioned serial type, the invention is also effectively applied for an apparatus provided with a recording head of the replaceable tip type, which is enabled to complete an electrical connection with the housing; and is also applicable for that provided with a recording head of the cartridge type, in which an ink tank is integrally equipped with the recording head.

Supplement of any recovery means or provisional auxiliary means to the recording head is more preferable for further stabilizing the effect of the invention. More specifically, these include means for capping, cleaning, pressurizing or absorbing purposes, attached to the recording head; or preparatory heating means associated with the electric transducer or a heating element provided for the transducer or any combination thereof, or performing a preparatory injection mode, each of these being effective for performing stable recording.

Also, as to the kind and number of mounted recording heads, there may be employed one head for each color, or a plurality of heads may be provided in accordance with the recording color or corresponding to colors of different density. That is to say, recording modes may include either a mode comprising only principal color such as black, or mode using an integrated recording heads or a plurality of combined heads. Also, any device, comprising at least one of a composite color of different colors or full color of mixed colors, is largely effective for the invention.

The ink materials for use in the invention may be those liquidized only at being used as provided with a recording signal, because, in general, the ink itself is temperature-controlled in the range of 30° to 70° C., so that the viscosity thereof may be within a stable injecting range. In addition, the temperature rise caused by thermal energy is prevented by utilizing such energy for conversion of the state from solid to liquid of the ink, or, for preventing evaporation, an ink which is solidified at the room temperature is employed. In all cases, it is effective to use an ink which is liquidized with energy supplied in accordance with a recording signal, and is injected as liquid state, or which begins to be solidified as soon as it is reached on the recording medium.

In these cases, the ink may be maintained as liquid or solid in recesses formed in a porous sheet or holes formed therethrough, and positioned opposed to the transducer head as disclosed in Japanese laid-open patent publication Nos. 54-56847 (1979) or 60-71260 (1985). Above all, the most effective arrangement for the invention is that performing the membrane boiling function as hereinabove mentioned.

Other than the application for an image output device of information processing instruments such as a computer, the invention may be also applicable, for example, for a copying machine combined with a reader, or a facsimile apparatus having function of transmission and reception.

What is claimed is:

1. An information processing apparatus having an external enclosure formed from a plurality of separate housings, comprising:
   a lower housing forming a first portion of said external enclosure;
   a carriage guide member attached to said lower housing for movably supporting a carriage for mounting a head member;
   an upper housing, having a recessed portion dimensioned and disposed to receive said head member therein, and having a movement restricting surface for restricting movement of said carriage, said upper housing forming a second portion of said external enclosure and being movably joined to said lower housing so that said upper housing and said lower housing can be opened away from one another to an opened state or closed toward one another to a closed state,
   wherein when said upper housing and said lower housing are in said closed state, said head member is prevented from being operable, and when said upper housing and said lower housing are in said open state, said head member is operable;
   wherein when head member mounted on said carriage is disposed at a predetermined location along said carriage guide member, and said upper housing and said lower housing are in said closed state, said head member is received in said recess portion, and
   wherein when said head member is positioned at a location other than said predetermined location, said movement restricting surface of said upper housing prevents upper housing and said lower housing from being moved into said closed state by engagement of an area other than said recess portion with said head member.

2. An information processing apparatus according to claim 1, wherein said head member comprises a reading head for reading image information from an original manuscript.

3. An information processing apparatus according to claim 1, wherein said head member comprises a recording head for recording image information onto a recording medium.

4. An information processing apparatus according to claim 3, wherein said head member further comprises an ink jet recording head for ejecting an ink from an ink ejecting opening for recording onto the recording medium.

5. An information processing apparatus according to claim 4, wherein said ink jet recording head is covered at its ink ejecting opening by a capping member disposed at a predetermined position along said carriage guide member.

6. An information processing apparatus according to claim 4, wherein said ink jet recording head comprises an electrothermal transducer and utilizes thermal energy generated by said electrothermal transducer for ejecting the ink.

7. An information processing apparatus having an external enclosure formed from a plurality of separate housings, comprising:
   a lower housing forming a first portion of said external enclosure;
   a carriage guide member attached to said lower housing for movably supporting a carriage for mounting a head member;
   an upper housing, having a recessed portion dimensioned and disposed to receive said head member therein, and having a movement restricting surface for restricting movement of said carriage, said upper housing forming a second portion of said external enclosure and being movably joined to said lower housing so that said upper housing and said lower housing can be opened away from one another to an opened state or closed toward one another to a closed state;
   wherein when said head member mounted on said carriage is disposed at a predetermined location along said carriage guide member, and said upper housing and said lower housing are in said closed state, said head member is received in said recess portion, and
   wherein when said head member is positioned at a location other than said predetermined location, said movement restricting surface of said upper housing prevents upper housing and said lower housing from being moved into said closed state by engagement of an area other than said recess portion with said head member.

8. An information processing apparatus according to claim 7, wherein said head member comprises a reading head for reading image information from an original manuscript.

9. An information processing apparatus according to claim 7, wherein said head member comprises a recording head for recording image information onto a recording medium.

10. An information processing apparatus according to claim 9, wherein said head member further comprises an ink jet recording head for ejecting an ink from an ink ejecting opening for recording onto the recording medium.

11. An information processing/apparatus according to claim 10, wherein said ink jet recording head is covered at its ink ejecting opening by a capping member disposed at a predetermined position along said carriage guide member.

12. An information processing apparatus according to claim 10, wherein said ink jet recording head comprises an electrothermal transducer and utilizes thermal energy generated by said electrothermal transducer for ejecting the ink.

13. An information processing apparatus having an external enclosure formed from a plurality of separate housings, comprising:
   a lower housing forming a first portion of said external enclosure;
   a carriage guide member attached to said lower housing for movably supporting a carriage for mounting a head member;
   an upper housing, having a recessed portion dimensioned and disposed to receive said head member therein, and having a movement restricting surface for restricting movement of said carriage, said upper housing forming a second portion of said external enclosure and being movably joined to said lower housing so that said upper housing and said lower housing can be opened away from one another to an opened state or closed toward one another to a closed state;
   a feed passage for accommodating a recording medium, said feed passage being defined by said upper housing and said lower housing when said upper housing and said lower housing are in said open state, said feed passage being formed transversely with respect to a moving direction of said carriage; and
   feed means for feeding said recording medium, said feed means being disposed in said upper housing, said feed means feeding said recording medium through said feed passage, wherein when said upper housing and said lower housing are in said closed state, said head member is prevented from being operable, and when said upper housing and said lower housing are in said open state, said head member is operable;

wherein when head member mounted on said carriage is disposed at a predetermined location along said carriage guide member, and said upper housing and said lower housing are in said closed state, said head member is received in said recess portion, and wherein when said head member is positioned at a location other than said predetermined location, said movement restricting surface of said upper housing prevents upper housing and said lower housing from being moved into said closed state by engagement of an area other than said recess portion with said head member.

14. An information processing apparatus according to claim 13, wherein said head member comprises a reading head for reading image information from an original manuscript.

15. An information processing apparatus according to claim 13, wherein said head member comprises a recording head for recording image information onto a recording medium.

16. An information processing apparatus according to claim 15, wherein said head member further comprises an ink jet recording head for ejecting an ink from an ink ejecting opening for recording onto the recording medium.

17. An information processing apparatus according to claim 16, wherein said ink jet recording head is covered at its ink ejecting opening by a capping member disposed at a predetermined position along said carriage guide member.

18. An information processing apparatus according to claim 16, wherein said ink jet recording head comprises an electrothermal transducer and utilizes thermal energy generated by said electrothermal transducer for ejecting the ink.

* * * * *